(12) United States Patent
Wu

(10) Patent No.: US 8,678,672 B2
(45) Date of Patent: Mar. 25, 2014

(54) CABLE ASSEMBLY WITH IMPROVED TRANSMISSION RATE

(75) Inventor: Jerry Wu, Irvine, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 69 days.

(21) Appl. No.: 13/281,396

(22) Filed: Oct. 25, 2011

(65) Prior Publication Data

US 2012/0099823 A1 Apr. 26, 2012

(30) Foreign Application Priority Data

Oct. 26, 2010 (CN) .......................... 2010 1 0519616

(51) Int. Cl.
*G02B 6/36* (2006.01)

(52) U.S. Cl.
USPC .................................. 385/88; 385/89; 385/93

(58) Field of Classification Search
USPC ..................................................... 385/89, 93
See application file for complete search history.

(56) References Cited

U.S. PATENT DOCUMENTS

| | | | | |
|---|---|---|---|---|
| 5,306,870 A | * | 4/1994 | Abat | 174/659 |
| 7,021,971 B2 | * | 4/2006 | Chou et al. | 439/660 |
| 7,572,071 B1 | * | 8/2009 | Wu | 385/94 |
| 8,398,314 B2 | * | 3/2013 | Ko et al. | 385/93 |
| 2011/0229083 A1 | * | 9/2011 | Dainese J nior et al. | 385/74 |

* cited by examiner

*Primary Examiner* — Omar Rojas

(74) *Attorney, Agent, or Firm* — Wei Te Chung; Ming Chieh Chang

(57) ABSTRACT

A cable assembly, comprising a housing having a plurality of receiving grooves recessing forwardly from a rear surface thereof, a plurality of lenses located on a front surface of the housing, a plurality of conductive terminals received in the housing and arranged in two rows, a cable electrically connected to the conductive terminals and a plurality of optical fibers received in the receiving grooves and alignment to the lenses, respectively. The receiving grooves are located between two rows of the conductive terminals.

16 Claims, 8 Drawing Sheets

CABLE ASSEMBLY WITH IMPROVED TRANSMISSION RATE

FIELD OF THE INVENTION

The present invention relates to a cable assembly, and more particularly to a cable assembly having high-speed transmission cable.

DESCRIPTION OF PRIOR ART

For the improvement of the technical requirement and the development of electronics industry, many technical solutions how to improve a cable assembly transmission rate have been proposed. Recently, it is mentioned that a USB cable assembly can transit optical signals to improve the transmission rate. The USB cable assembly improved the transmission rate by setting an optical fiber. The USB cable assembly comprises a housing, a set of terminals received in the housing, a metal cover enclosing the housing, a cable connected to the terminals and an optical module mounted in the metal cover. The optical module includes an optical fiber and an insulative module enclosing the optical fiber. The optical module is retained on the housing. When the cable assembly is mated to a complementary connector and the optical module is mated to an optical module of the complementary connector, the signal transmission rate of the cable assembly is high. On the base of this technology, more and more people try to add an optical fiber in the other cable assemblies by similar technical solutions for improving the transmission rate thereof. However, some cable assemblies are small, and a space of the cable assembly is not enough to install an optical module on a housing of the cable assembly.

As discussed above, it is introduced that a cable assembly can improve the transmission rate by using an optical fiber.

SUMMARY OF THE INVENTION

Accordingly, an object of the present invention is to provide a cable assembly for improving the transmission rate.

In order to achieve the above-mentioned objects, a cable assembly, comprising a housing having a plurality of receiving grooves recessing forwardly from a rear surface thereof, a plurality of lenses located on a front surface of the housing, a plurality of conductive terminals received in the housing and arranged in two rows, a cable electrically connected to the conductive terminals and a plurality of optical fibers received in the receiving grooves and alignment to the lenses, respectively. The receiving grooves are located between two rows of the conductive terminals.

Other objects, features and advantages of the invention will be apparent from the following detailed description taken in connection with the accompanying drawings.

DETAILED DESCRIPTION OF PREFERRED EMBODIMENTS

Figure 1:
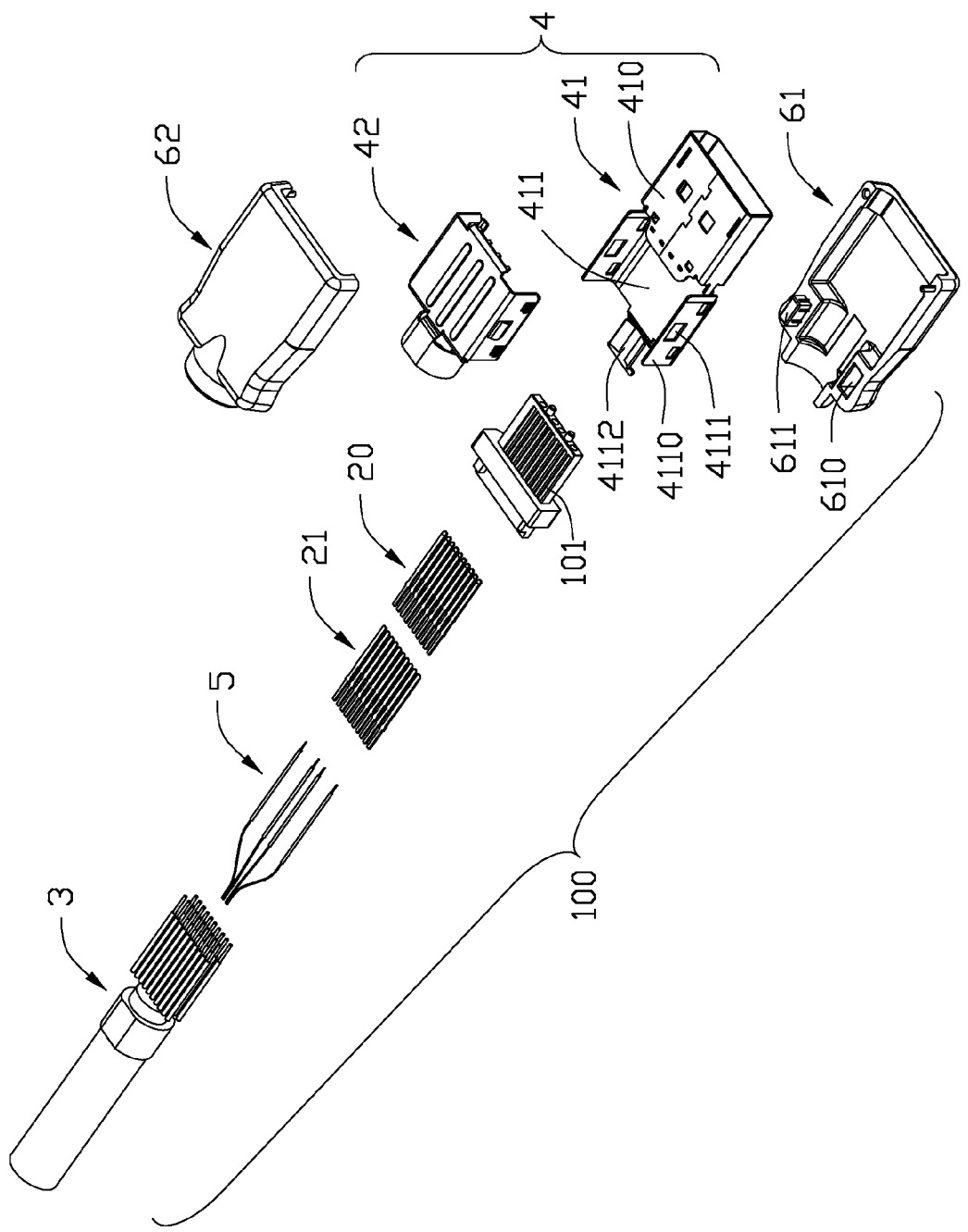
FIG. 1 is an exploded, perspective view of a cable assembly in accordance with the present invention.

Reference will now be made to the drawing figures to describe the present invention in detail.

Referring to FIGS. 1 to 8, a cable assembly 100 in accordance with the present invention comprises a housing 1, a plurality of conductive terminals 2 received in the housing 1, a round cable 3 electrically connected to the conductive terminals 2, a metal shell 4 enclosing the housing 1, a number of optical fibers 5 received in the housing 1 and an insulative cover 6 enclosing the metal shell 4.

Figure 2:
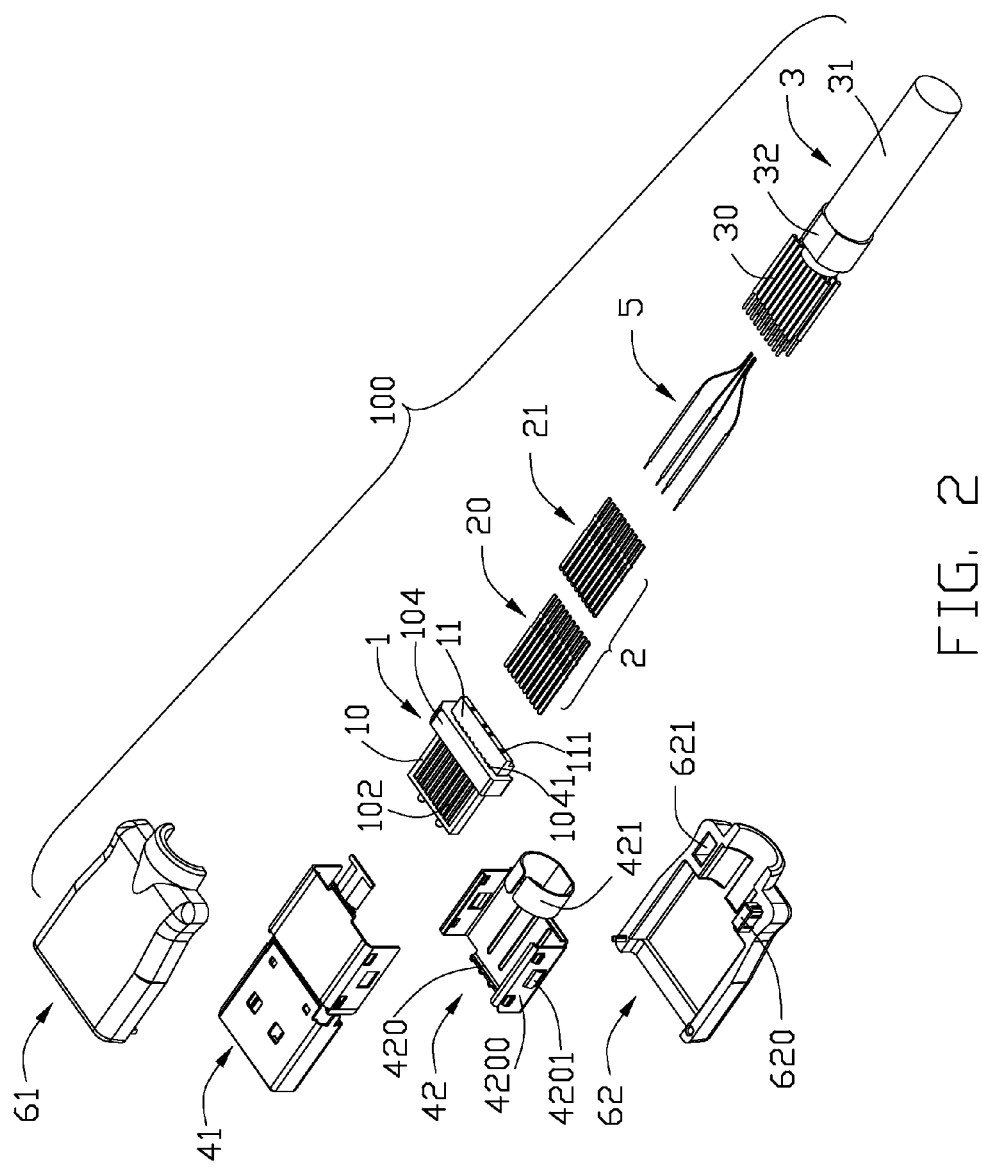
FIG. 2 is a view similar to FIG. 1, but from another aspect.
Figure 3:
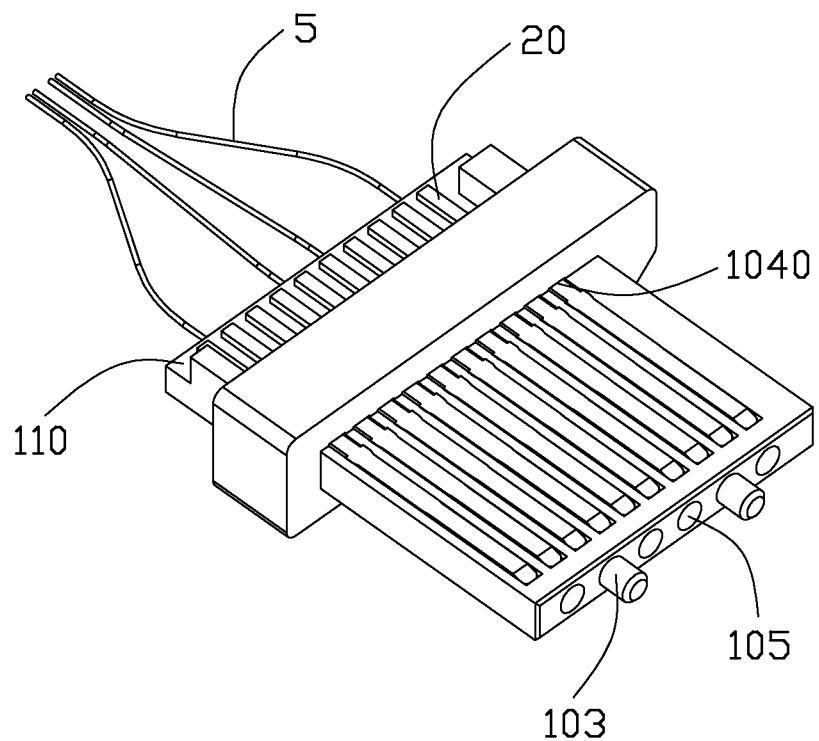
FIG. 3 is an assembled view that an optical fiber is received in a housing of the cable assembly shown in FIG. 1.
Figure 4:
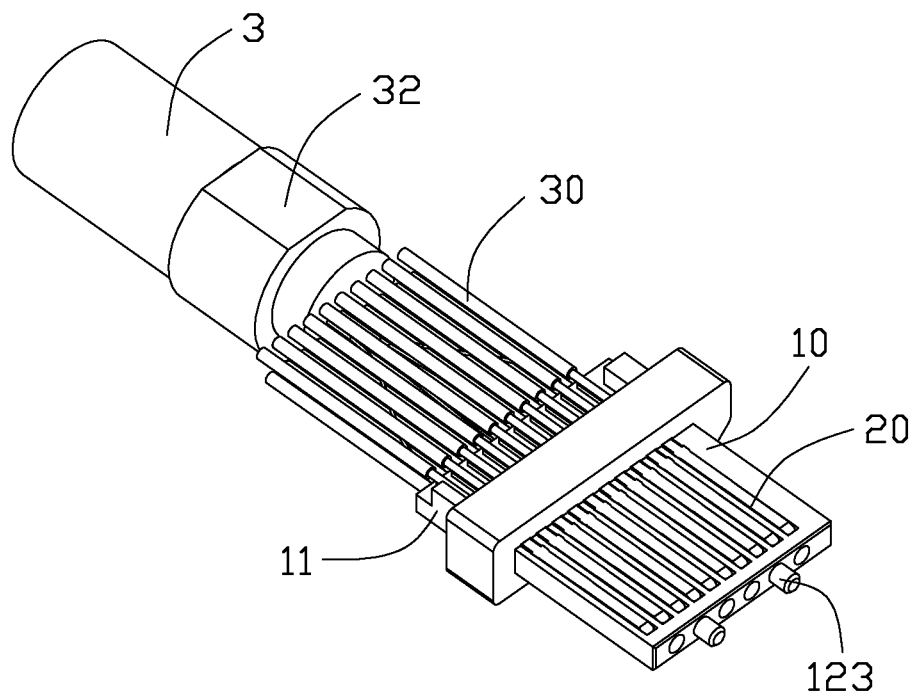
FIG. 4 is an assembled view that a cable is connected to a number of conductive terminals of the housing of the cable assembly shown in FIG. 3.
Figure 5:
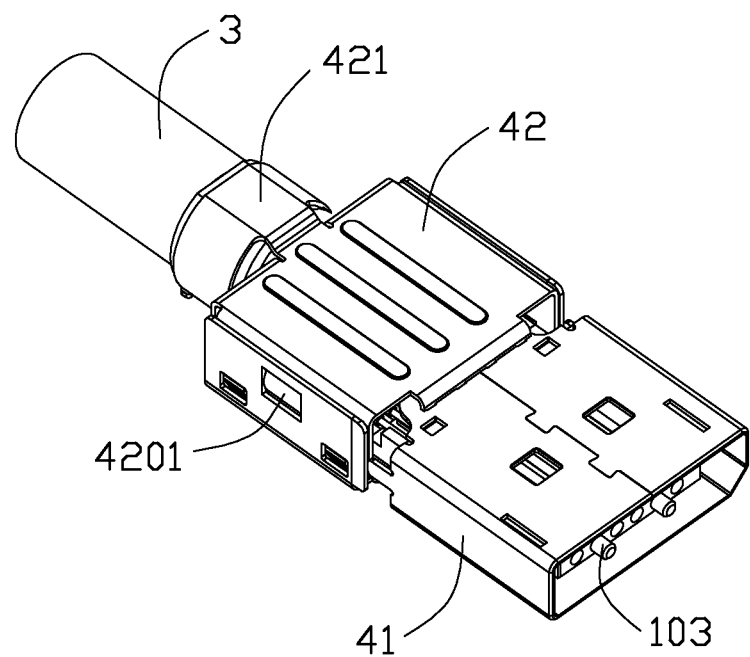
FIG. 5 is a partially assembled, perspective view of the cable assembly shown in FIG. 1.
Figure 6:
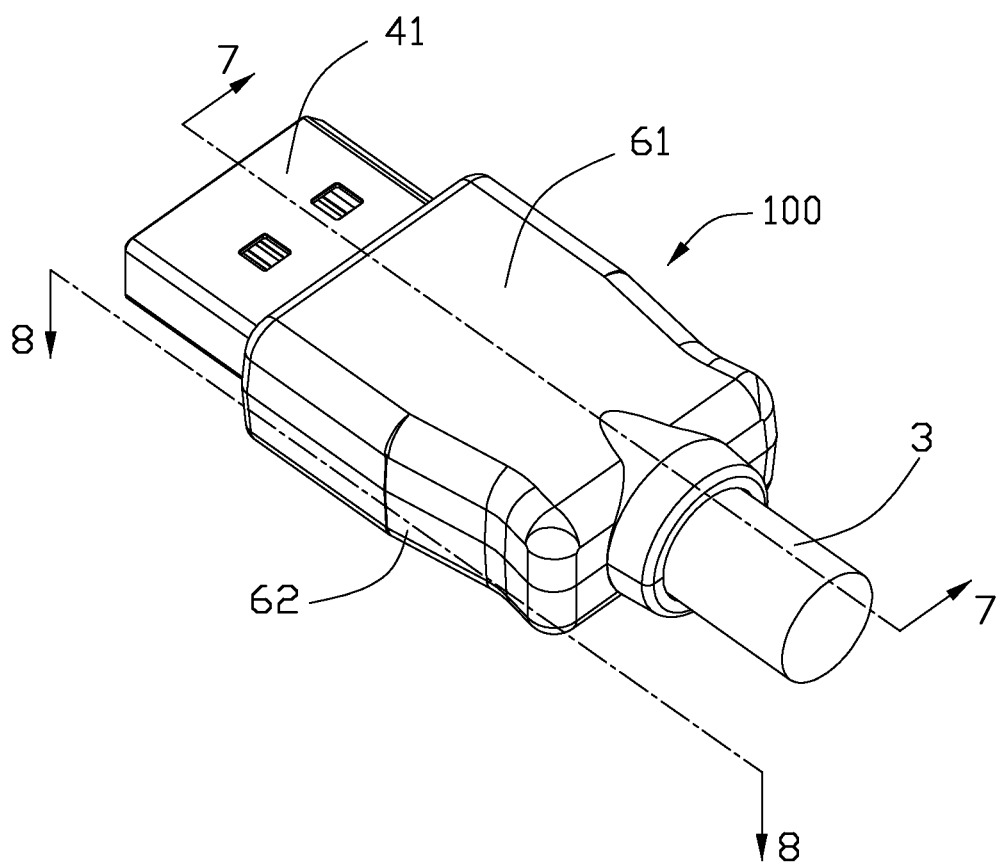
FIG. 6 is an assembled, perspective view of the cable assembly shown in FIG. 1.
Figure 7:
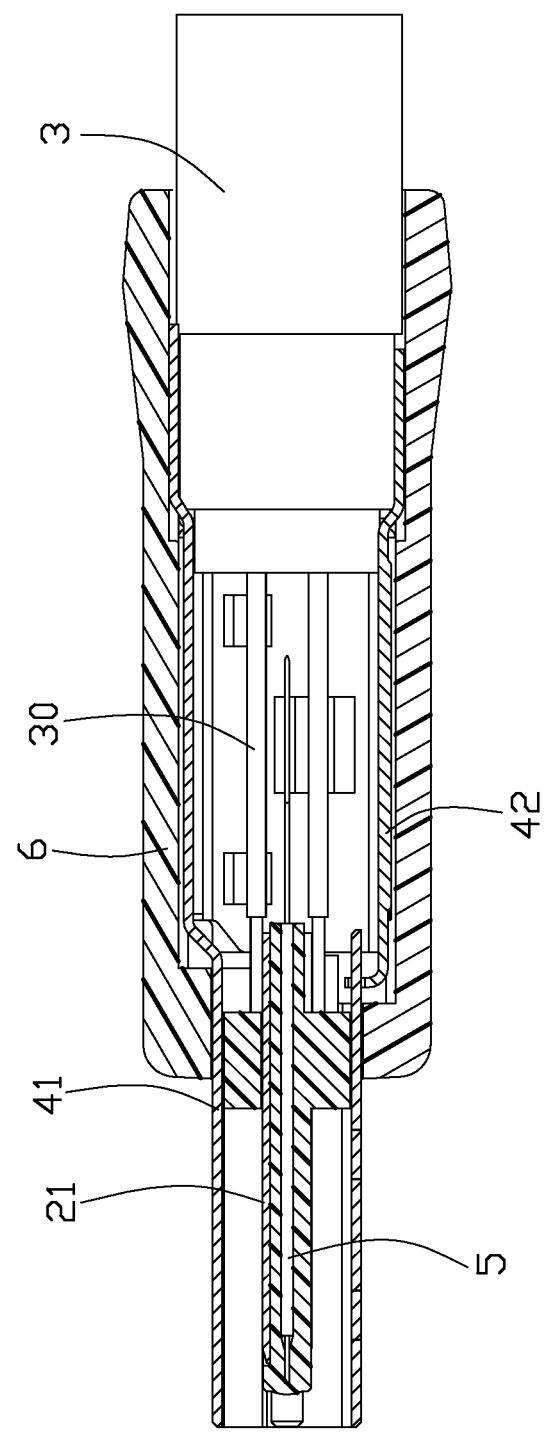
FIG. 7 is a cross section view of the cable assembly of FIG. 6 taken along line 7-7.
Figure 8:
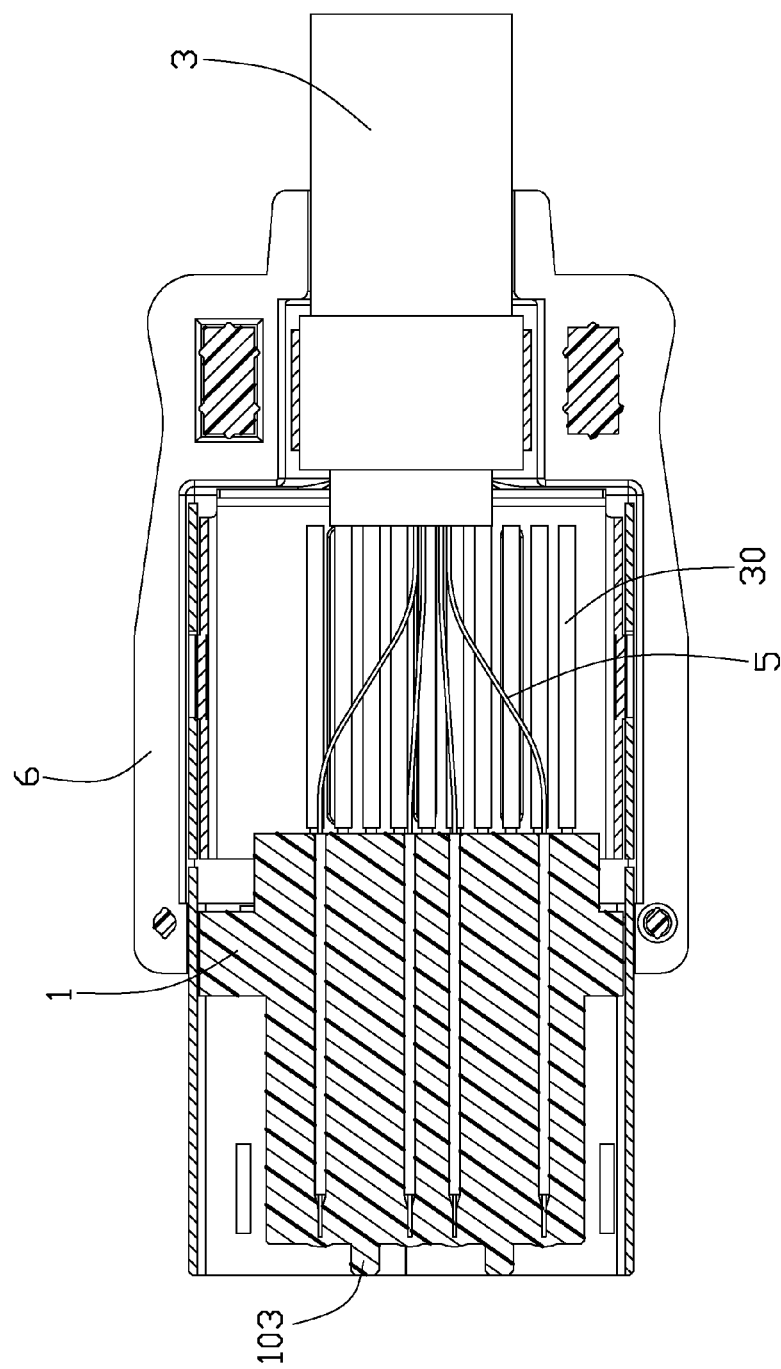
FIG. 8 is a cross section view of the cable assembly of FIG. 6 taken along line 8-8.

Referring to FIG. 1 to FIG. 3, the housing 1 comprises a main portion or mating tongue 10 and a flat portion 11 extending rearwardly from the main portion 10. A first recessing portion 101 and a second recessing portion 102 are respectively recessed inwardly from an upper and rear surface of the main portion 10. A frame portion or base portion 104 is located between the main portion 10 and a flat portion 11. The frame portion 104 defines a first slits 1040 located on an upper surface of the flat portion 11 and communicated with the first recessing portion 101, and a second slits 1041 located on a lower surface of the flat portion 11 and communicated with the second recessing portion 102, a pair of guiding posts 103 is extended forwardly from a front surface of the housing 1. A number of lenses 105 is inserted into the front end of the housing 1. A cutout 110 is recessed downwardly from the upper rear surface of the flat portion 11. The flat portion 11 also defines a plurality of receiving grooves 111 recessing forwardly from the rear surface thereof and run through the rear and front surface of the housing 1. The receiving grooves 111 are alignment to the lenses 105 located on the front thereof, respectively.

All of conductive terminals 2 are arranged in two rows. The conductive terminals 2 comprise a set of upper terminals 20 received in the first recessing portions 101 and a set of lower terminals 21 received in the second recessing portions 102, respectively.

The cable 3 defines a number of wires 30 which are electrically connected to the upper terminals 20 and the lower terminals 21, respectively. An insulative pin 31 enclosing the wires 30 and a braid (not shown) enclosed in the insulative pin 31. A metal ring 32 is retained on the braid (not shown) of the cable 3. In other embodiments, the optical fibers 5 can be a part of the cable 3. The insulative pin 31 may enclose the optical fibers 5.

The metal shell 4 defines a first shell 41 and a second shell 42 assembled on the first shell 41. The first shell 41 comprises a tubular mating portion 410 located on a front end thereof and an U-shaped retaining portion 411 extending rearwardly from the lower surface of the mating portion 410. A pair of locking holes 4111 are respectively defined on two lateral sides 4110 of the retaining portion 411. A splinter 4112 is extended rearwardly from a mid of a lower surface of the retaining portion 411. The second shell 42 comprises a U-shaped basic portion 420 corresponded to the retaining portion 411 and a holding portion 421 extending rearwardly from a mid of a lower surface of the basic portion 420. A pair of locking pins 4201 are respectively located on two lateral sides 4200 of the basic portion 420. The locking pin 4201 is raised and corresponded to the locking hole 4111.

The insulative cover 6 comprises a lower cover 61 and an upper cover 62 assembled on the lower cover 61. The structure of the lower cover 61 is as same as the structure of the upper cover 62. The upper cover 62 defines a first column 620 located on a side of a lower surface thereof and a first receiving hole 621 located on another side of the lower surface thereof. The lower cover 61 defines a second column 611 corresponded to and received in the first receiving hole 621, and a second receiving hole 610 corresponded to and receiving the first column 620.

In assembly, the upper terminals 20 are received in the first recessing portion 101 of the housing 1, of which the lenses 105 are inserted into the front end. The lower terminals 21 are received in the second recessing portion 102 of the housing 1. The optical fibers 5 are respectively received in the receiving grooves 111. The optical fibers 5 are arranged in a row and located between the upper terminals 20 and the lower terminals 21. The optical fibers 5 are alignment to or connected to the lenses, respectively. Each wire 30 of the cable 3 is soldered on a tail of each conductive terminal 2. The housing 1 is enclosed in the first shell 41, and the metal ring 32 is supported on the splinter 4112. The locking pin 4201 of the second shell 42 is assembled in the locking hole 4111 of the first shell 41 for retaining the first shell 41 and the second shell 42. The holding portion 421 holds the metal ring 32 and the splinter 4112. The metal shell 4 and the cable 3 are enclosed in the insulative housing 6. The second and first columns 611, 620 respectively are received in the first and second receiving hole 621, 610. The holding portion 421 is enclosed in the insulative housing 6.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A cable assembly, comprising:
    a housing having a plurality of receiving grooves recessing forwardly from a rear surface thereof;
    a plurality of lenses located on a front surface of the housing;
    a plurality of conductive terminals received in the housing and arranged in two rows;
    a cable electrically connected to the conductive terminals; and
    a plurality of optical fibers received in the receiving grooves and aligned with the lenses, respectively; wherein
    the receiving grooves are located between two rows of the conductive terminals;
    further comprising a metal shell enclosing the housing, an insulative cover enclosing the metal shell, and a metal ring retained on a braid of the cable;
    wherein the metal shell defines a holding portion located on a rear end thereof and holding the metal ring.

2. The cable assembly as recited in claim 1, wherein the optical fibers are arranged in a row.

3. The cable assembly as recited in claim 1, wherein the optical fibers are connected to the lenses, respectively.

4. The cable assembly as recited in claim 3, wherein the conductive terminals defines upper terminals located on an upper surface of the housing and lower terminals located on a lower surface of the housing.

5. The cable assembly as recited in claim 4, wherein the housing also defines a first recessing portion recessing downwardly from the upper surface of the housing and enclosing the upper terminals.

6. The cable assembly as recited in claim 5, wherein the housing also defines a second recessing portion recessing upwardly from the lower surface of the housing and enclosing the lower terminals.

7. The cable assembly as recited in claim 1, wherein a pair of guiding posts are extended forwardly from the front surface of the housing.

8. The cable assembly as recited in claim 1, wherein the optical fibers are a part of the cable.

9. A cable assembly, comprising:
    a housing having a plurality of receiving grooves recessing forwardly from a rear surface thereof;
    a plurality of lenses located on the front of the receiving grooves, respectively;
    a plurality of conductive terminals received in the housing and located at two sides of receiving grooves;
    a cable having a number of wires electrically connected to the conductive terminals and a plurality of optical fibers received in the receiving grooves for aligning to the lenses, respectively;
    further comprising a metal shell enclosing the housing, and a metal ring retained on a braid of the cable;
    wherein the metal shell defines a holding portion located on a rear end thereof and holding the metal ring.

10. The cable assembly as recited in claim 9, wherein the conductive terminals are arranged in two rows, and the optical fibers are arranged in a row and located between the two rows of the conductive terminals.

11. The cable assembly as recited in claim 9, wherein the optical fibers are connected to the lenses, respectively.

12. A cable connector assembly for mating with a complementary connector having electrical contacts and optical units thereof, comprising:
    an insulative housing defining a base portion with a mating tongue extending forwardly therefrom;
    two rows of terminals disposed upon two opposite surfaces of the main portion, respectively, for mating the electrical connects of the complementary connector in a vertical direction;
    a plurality of lenses embedded in the mating tongue between two opposite surfaces for forwardly coupling respectively to the optical units of the complementary connector in a front-to-back direction perpendicular to said vertical direction; and
    a round cable connected to a rear side of the housing and defining a plurality of wires electrically connected respectively to the corresponding terminals, and a plurality of optic fibers optically connected respectively to the corresponding lenses; wherein
    the wires are arranged in two rows and the fibers are arranged in one row between said two rows of the wires in the vertical direction before both said wires and said fibers are converged into the round cable;
    further comprising a metal shell enclosing the insulative housing, and a ring retained on the cable, wherein the metal shell defines a holding portion located on a rear end thereof and holding the ring.

13. The cable connector assembly as claimed in claim 12, wherein said wires are directly mechanically connected to the corresponding terminals, respectively.

14. The cable connector assembly as claimed in claim 12, wherein the main portion is equipped with a pair of forwardly extending guiding posts at a front edge thereof.

15. The cable connector assembly as claimed in claim 14, further including a metallic shell enclosing the housing, wherein a tip of each of the guiding posts does not extend beyond a front edge of the shell.

16. The cable connector assembly as claimed in claim 14, wherein each of the guiding posts is equipped with two lenses by two sides in a transverse direction perpendicular to both the front-to-back direction and the vertical direction.

\* \* \* \* \*